(12) United States Patent
Rogers et al.

(10) Patent No.: US 11,366,923 B2
(45) Date of Patent: Jun. 21, 2022

(54) ANALYTICS INTERFACE WITH PRIVACY MANAGEMENT

(71) Applicant: Microsoft Technology Licensing, LLC, Redmond, WA (US)

(72) Inventors: Ryan M. Rogers, Sunnyvale, CA (US); David Anthony Durfee, San Francisco, CA (US); Sean S. Peng, Richmond, CA (US); Subbu Subramaniam, Sunnyvale, CA (US); Seunghyun Lee, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 290 days.

(21) Appl. No.: 16/724,281

(22) Filed: Dec. 21, 2019

(65) Prior Publication Data
US 2021/0192068 A1 Jun. 24, 2021

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01); *G06F 21/604* (2013.01); *G06F 21/6254* (2013.01); *G06F 21/6281* (2013.01)

(58) Field of Classification Search
CPC .. G06F 21/6227; G06F 21/602; G06F 21/604; G06F 21/6281; G06F 21/6254
See application file for complete search history.

(56) References Cited

U.S. PATENT DOCUMENTS

| 2016/0269417 | A1* | 9/2016 | Saxena | H04L 63/06 |
| 2017/0169253 | A1* | 6/2017 | Curcio | G06F 21/6254 |
| 2019/0318121 | A1* | 10/2019 | Hockenbrocht | G06F 16/2358 |
| 2020/0250335 | A1* | 8/2020 | Hockenbrocht | G06F 16/9535 |

OTHER PUBLICATIONS

Jaiswal, "Python Data Type Conversion Tutorial", Dec. 2017, obtained from archive.org at https://web.archive.org/web/20190225043832/https://www.datacamp.com/community/tutorials/python-data-type-conversion, archived on Feb. 25, 2019 (Year: 2019).*

* cited by examiner

*Primary Examiner* — Alexander Lagor
*Assistant Examiner* — Forrest L Carey
(74) *Attorney, Agent, or Firm* — Nicholson De Vos Webster & Elliott LLP (57) ABSTRACT

In an embodiment, the disclosed technologies include receiving a query that requests aggregate information about entity event data relating to digital content delivered digitally by an entity management system to entities of the entity management system, the query associated with a requester account; determining a first privacy allocation for the requester account; determining a first privacy value, the first privacy value computed based on the query and a selected privacy algorithm; deducting the first privacy value from the first privacy allocation to produce a first privacy balance; causing executing of the query on the entity event data and providing a result set in response to the query only if the first privacy balance indicates that the first privacy allocation has not been depleted.

18 Claims, 5 Drawing Sheets

ANALYTICS INTERFACE WITH PRIVACY MANAGEMENT

TECHNICAL FIELD

A technical field to which the present disclosure relates includes data analytics systems. Other technical fields to which this disclosure relates include application programming interfaces and entity management systems.

BACKGROUND

Analytics databases can be used to store information about users of a particular computer system. To protect users' privacy and comply with applicable laws, rules, regulations or policies, analytics databases may contain only aggregated user information, such as counts, distributions, and histograms. Privacy algorithms, such as differential privacy algorithms, can be used to protect users' identifying information from being exposed while allowing aggregate information to be released.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

If adequate privacy protection measures are not in place, an adversary may be able to use information about a person that is available outside of a database to obtain information in the database about that same person, even though the database is considered to be secure. Differential privacy (DP) techniques may be used to address this problem and thus allow for aggregate information about a dataset to be revealed without disclosing any particular individual's information.

As used herein, differential privacy may refer to a property of a computation (i.e., an algorithm) such that when the computation is performed on a dataset to produce a privatized result, any entity that receives the privatized result cannot determine with certainty whether or not a specific individual's data is contained in the dataset.

A drawback of prior approaches to preserving data privacy is that they tend to be reactive, because they rely on post-hoc analysis of historical data, such as query logs. As a result, data privacy breaches are not discovered until after the breaches have already occurred, which is too late.

A drawback of prior DP approaches is that they tend to monitor specific items of event data, rather than monitoring the behavior of user accounts that request access to event data in the aggregate. For example, an engagement analytics system may provide an interface through which requests for aggregate information about user engagement can be submitted by requesting user accounts. In prior approaches, leakage of individual identifying information is sought to be prevented by limiting access to information about particular engagement events in accordance with a DP algorithm, on the theory that using a DP algorithm to obfuscate those individual events from appearing in the search results will be enough to prevent individual identifying information from being revealed. However, if requests for aggregate information are repeated multiple times, for example by the same requester on the same or similar database, the requester may be able to reconstruct the database or otherwise derive individual identifying information that is supposed to remain protected, even when DP is used to protect the information in the database.

Whereas prior event-level approaches only protect individual data records from being exposed in response to an individual query, the disclosed user-level approach seeks to protect all data records of a particular user from unauthorized access by an aggregate data requester.

A benefit of embodiments of the disclosed technologies is that they are preemptive, rather than reactive. For example, embodiments maintain digital "privacy allocations" for requester accounts. The privacy allocations are automatically depleted over time as the requester accounts execute queries against a database and as information is provided to the requester accounts in response to those queries. Once a privacy allocation has been depleted, no additional information is provided to the requester account, unless the privacy allocation is refreshed. Thus, whereas previous approaches might be able to detect, after the fact, that a particular user's activity level spiked during a certain time period that has already passed, the disclosed approaches can closely manage users' access to data by adjusting the users' privacy allocation balance on a per-query basis, so that the users' privacy allocations are not exceeded.

As used herein, requester account may refer to an account of an individual user an account that corresponds to multiple different users. Thus, a query request as used herein may include both a user ID and an account ID, or only a user ID, or only an account ID. In this way, privacy allocations can be established and managed at the user level, at the account level (so that all users within the same account get one allocation), or both (so that individual users get individual allocations and the users within the same account also have a 'group' allocation).

Embodiments set privacy parameters in accordance with a selected privacy algorithm so that privacy allocations are depleted before individual identifying information is revealed. Embodiments may reset privacy allocations for particular requesting accounts after a time interval has elapsed or some other criterion has been met. Embodiments may set parameters for replenishing privacy allocations according to selected privacy algorithms, so that individual identifying information remains protected notwithstanding periodic replenishment of the privacy allocations.

Another benefit of embodiments of the disclosed technologies is that individual identifying information can be protected from being improperly disclosed to previously unknown/previously unseen bad actors. To do this, embodiments monitor queries on a per requester basis, rather than by blocking access to specific engagement events. For example, embodiments maintain privacy allocations for individual requesters of analytics data, such as external analysts or organizations who may periodically query an analytics system for aggregate information. As a result, embodiments can keep track of the number of requests made by particular requester accounts and the amount of information provided to those requester accounts. This approach enables embodiments to proactively respond to each subsequent request for aggregate information in a way that prevents the leakage of individual identifying information to the requesters. In this way, the disclosed approaches can protect data privacy in situations where event-based approaches would fail.

One technical challenge of implementing the disclosed approaches in a real time and/or distributed query/analytics environment is to ensure that the privacy allocation is kept up to date and in sync with the most recent requests that have been received from particular requester accounts. As described in more detail below, embodiments address this challenge in various ways including by issuing additional back-end queries in a real time environment or by using a key-value based implementation.

Another technical challenge is providing a scalable, reliable, real-time interface for distributed data analytics with low latency and differential privacy. Embodiments address this challenge by incorporating a privacy allocation management tool into an API (application programming interface) for a real-time distributed OLAP (online analytical processing) system.

System Overview

Figure 1:
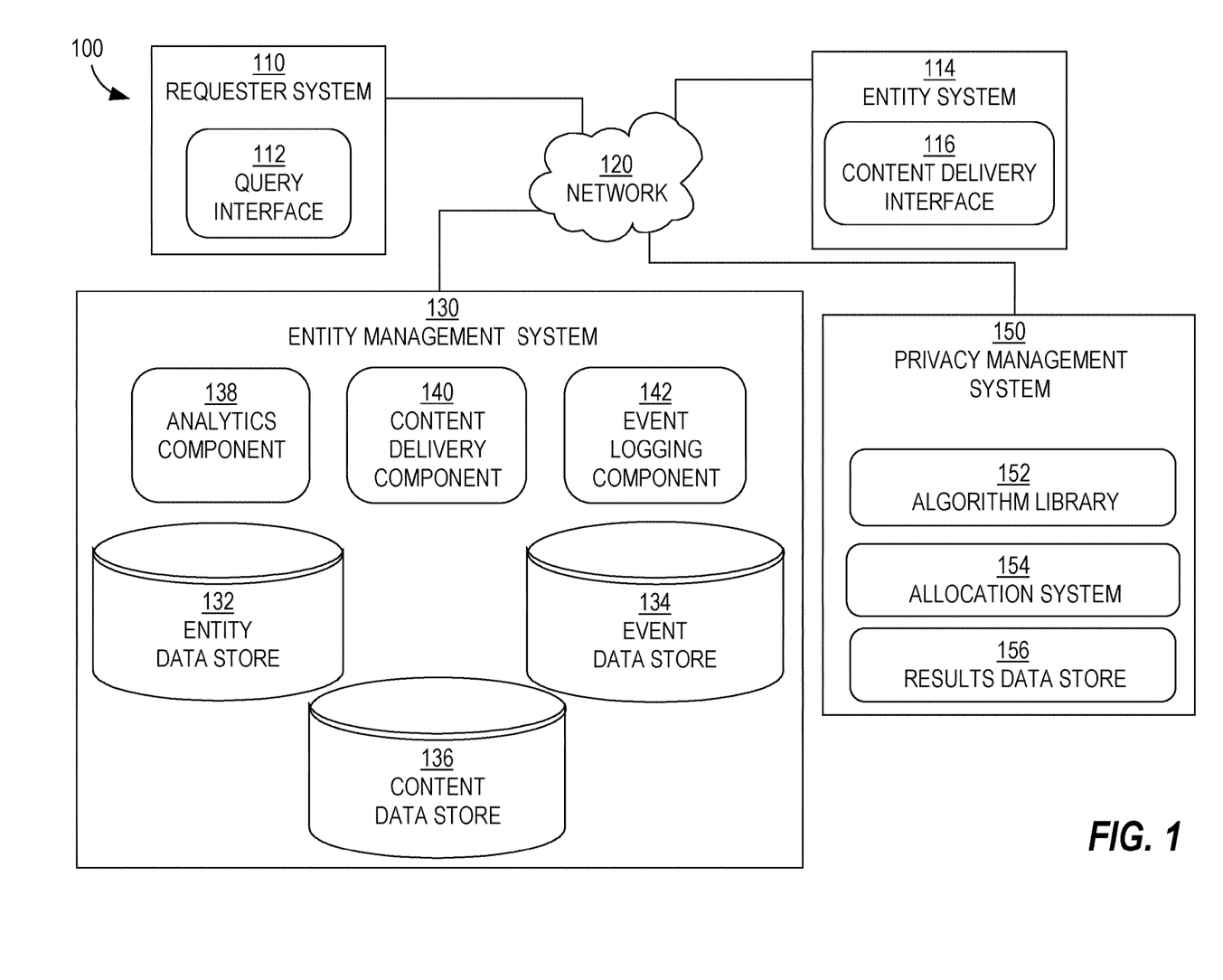
FIG. 1 is a block diagram of a computing system, in an embodiment.

FIG. 1 is a block diagram of an example system 100 for generating related queries, in an embodiment. System 100 includes a requester system 110, an entity system 114, a network 120, an entity management system 130, and a privacy management system 150. Requester system 110 communicates bidirectionally with at least entity management system 130 over network 120. Entity management system 130 communicates bidirectionally with at least entity system 114 and privacy management system 150 over network 120. Entity system 114 communicates bidirectionally with at least entity management system 130 over network 120.

System 100 or any of its component systems 110, 114, 130, 150 may include any number of client computers and/or server computers that interact with each other over network 120. For example, system 100 or any of its component systems 110, 114, 130, 150 may comprise multiple computing elements and devices that may be connected in a local network or distributed regionally or globally across many networks via the Internet. Although depicted in FIG. 1 as individual systems, all or portions of requester system 110, entity management system 130, entity system 114 and/or privacy management system 150 may be part of the same overall system and may be provided or owned or managed by the same entity.

Portions of system 100 may be implemented as a web application. For example, a portion of system 100 may operate in entity management system 130 or privacy management system 150 and another portion may operate in a web browser executing on a client device, such as a requester system 110 or an entity system 114. In such embodiment, the web browser transmits a HTTP request over a network (e.g., the Internet) in response to user input (e.g., entering of text and selection of a graphical button) that is received through a user interface provided by the web application and displayed through the web browser. Entity management system 130 or privacy management system 150 receives the input, performs one or more operations to conduct a search of, for example, entity data store 132, event data store 134, content data store 136, or results data store 156, and returns zero or more results to the client device in an HTTP response that the web browser receives and processes. Alternatively, a client-side application is installed and executes on a client device and communicates with entity management system 130 and/or privacy management system 150 over a network, such as network 120.

Requester system 110 interacts with entity management system 130 or privacy management system 150; for example, by communicating queries to entity management system 130 or privacy management system 150 and/or obtaining data from entity management system 130 or privacy management system 150 in response to those queries. Requester system 110 includes a query interface 112. Query interface 112 may be implemented as a user interface operable by one or more requesters; that is end users of an analytics component 138 of entity management system 130 and/or results data store 156 of privacy management system 150. Requester as used herein may refer to an individual or a group of individuals, such as a company, an association, or an institution, which is permitted to submit queries for aggregate information to entity management system 130 or privacy management system 150.

Alternatively or in addition, query interface 112 may be implemented as an application program interface (API) through which automated agents, or other components and/or systems may interact with entity management system 130 or privacy management system 150. In an embodiment, query interface 112 may facilitate creating and executing search queries or viewing aggregate data stored in results data store 156 of privacy management system 150 rather than by directly accessing data stored in entity data store 132 or event data store 134 of entity management system 130.

Entity system 114 interacts with entity management system 130; for example, by communicating queries to entity management system 130 and/or obtaining data from entity management system 130. Entity system 114 includes a content delivery interface 116. Content delivery interface 116 may be implemented as a user interface operable by one or more end users of a content delivery component 140 of entity management system 130 and/or as an application program interface (API) through which other components and/or systems may interact with entity management system 130. In an embodiment, content delivery interface 116 may facilitate an end user's viewing of digital content, such as entity profiles, messages, and feed items, which may be stored in entity data store 132 or content data store 136, for example.

Network 120 may be implemented on any medium or mechanism that provides for the exchange of data, signals, and/or instructions between component systems 110, 150, 130, 140 of system 100. Examples of network 120 include, without limitation, a Local Area Network (LAN), a Wide Area Network (WAN), an Ethernet network or the Internet, or one or more terrestrial, satellite or wireless links, or a combination of any number of different networks and/or communication links.

Entity management system 130 and privacy management system 150 are each described in more detail in the following sections.

As used herein, an example of a system is an application or a computing device or a combination of electronic devices or a combination of at least one application and at least one device. Examples of computing devices and electronic devices include server computers, laptop computers, tablet computers, smartphones, desktop computers, personal digital assistants (PDAs), wearable electronic devices, and smart appliances.

An example of an application is a native application that is installed on a particular type of computing device or configured to operate with a particular operating system. Another example of an application is a client application that is downloaded from a server computer and executes within web browser software running on a computing device. Another example of an application is a server application that runs on a server computer or on a network of server computers. An application may be implemented in hardware, software, or a combination of hardware and software. An application may include a data store or may be communicatively coupled to a data store. Thus, a system may include a combination of an application and a data store. As used herein, the term data store may refer to a logical data structure, such as a searchable database, an index, a table, a tree, or an electronic file, such as an HTML (Hypertext Markup Language) file or an XML (Extensible Markup Language) file.

Although the various systems, data stores, components and devices are depicted in the figures and described as including certain features, all embodiments are not limited to requiring these features and some embodiments may include additional features not described herein. Further, the particular arrangement of systems, components, data stores, and devices shown in the drawings represents one example of an implementation. It will be understood that items shown as separate components, devices, systems, or data stores may be combined together in other implementations and that individual items may be further broken down into smaller elements or subsets of functionality in other implementations.

Entity Management System

In the embodiment of FIG. 1, entity management system 130 includes an entity data store 132, an event data store 134, a content data store 136, an analytics component 138, a content delivery component 140, and an event logging component 142. Although not specifically shown in FIG. 1, it will be understood that entity data store 132, event data store 134, content data store 136, analytics component 138, content delivery component 140, and event logging component 142 are bidirectionally communicatively coupled as needed to perform the functionality of entity management system 130. Examples of components are applications, computer program modules, and code libraries. Examples of communicative coupling mechanisms include inter-process communication (IPC) interfaces and application program interfaces (APIs).

Entity data store 132, event data store 134, and content data store 136 each may reside on one or more persistent and/or volatile storage devices that may reside within the same local network as entity management system 130 and/or in a network that is remote relative to entity management system 130. Thus, although depicted as being included in entity management system 130, each data store 132, 134, 136 may be part of entity management system 130 or accessed by entity management system 130 over a network, such as network 120. Entity data store 132 stores data relating to entities, including entity identifiers.

Event data store 134 stores historical data relating to engagement events detected by event logging component 142 and search events detected by analytics component 138, each described below, as having been performed by at least one user, or associated with at least one user account, in entity management system 130 or in privacy management system 150. Event data store 134 includes, for example, event logs and search logs, which are data records of engagement events and/or search activities performed by users of entity management system 130 or privacy management system 150. In an embodiment, a search activity data record includes at least a user account identifier, a timestamp, and a raw query as entered by the user, while an engagement event entity includes at least a user account identifier, a timestamp, and event data that identifies the type of event performed and any inputs provided by the user. In an embodiment, event data store 134 stores data collected by event logging component 142 as described in more detail below.

Content data store 136 includes a searchable store of digital content, which may be updated to include new items of content from time to time. Content data store 136 may include online and/or offline data sources. In other embodiments, content data store 136 may include feed items, such as documents, images, videos, links to web sites on the Internet; for example, web sites that publish news articles, blogs, comments, tweets, and reviews; social media pages, posts, and/or news feeds. Digital content within content data store 136 can be searched and retrieved through execution of a query by, for example, an Internet search engine, an RSS (Really Simple Syndication) feed or a web crawler operated by content delivery component 140 cooperating with query interface 112.

Analytics component 138 communicates bidirectionally with query interface 112 and with privacy management system 150 to allow one or more requesters using requester system 110 to obtain aggregate information pertaining to engagement events occurring in entity management system 130 within the constraints imposed by privacy management system 150. Examples of queries for aggregate information include top-k queries and queries that produce as result sets other types of counts, histograms, statistics, or distributions. As described in more detail below, analytics component 138 receives queries from query interface 112, makes calls to algorithm library 152 and allocation system 154 to determine whether results can be returned to particular requesters and if so, how many results can be returned to the particular requesters, and provides result sets containing privatized aggregate information to query interface 112 in response to the received queries.

Content delivery component 140 interfaces with entity system 114 to deliver digital content items stored in content data store 136 to content delivery interface 116, so that an end user of entity system 114 may view and manipulate the digital content items through content delivery interface 116. Examples of digital content items include search results and notifications. Examples of electronic notifications include synchronous or asynchronous messages, alerts, feed items, recommendations, listings of search results, displays of entity data, and deliveries of digital content items.

Event logging component 142 logs data relating to events that occur within entity management system 130 and/or privacy management system 150 while in operation; for example, logins, searches, and user actions relating to digital content made available to a user of entity management system 130 via content delivery component 140, such as views, likes, comments, and shares of digital content. Other examples of events include actions that may be taken by a user, for example via a user account registered within entity management system 130, such creating and executing searches, posting or submitting content for consideration by other entities, viewing content posted by other entities, viewing entity profile pages, exchanging messages with other users, commenting on content posted by other users and following entities.

Event logging component 142 stores event data relating to logged digital events in event data store 134. Operations performed by event logging component 142 may be restricted or subject to user consent as required by any applicable laws, rules, regulations or policies.

In an embodiment, entity management system 130 is implemented as or includes an entity search and retrieval service that is supported by a connection network. Examples of connection networks include social networks, professional connection networks, and other applications that store data pertaining to entities and indicate relationships or 'connections' between and among entities. In this context, entity data store 132 stores entity data records that include profile data and connection data associated with individual entities. An entity may be a person, an organization (e.g., a company, a charity, a non-profit organization, a government agency, an alumni group, etc.), a group of people, or an association, for example.

Profile data for a person may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user. Profile data of an organization, such as a company, may include a company name, an address of the company, a number of employees, a listing of principals or chief executives of the company, a description of any current job openings, and a description of products or services provided by the organization.

Profile data can also include derived or computed data that, with the user's consent as may be required by applicable laws, rules, policies, or regulations, is collected and stored, for example by analytics component 138, based on actions that the user has taken within entity management system 130. Profile data can also include connection data. Connection data for an entity may include an entity identifier of another entity and a date/timestamp indicating the date and time that a connection with the other entity was made.

A user of entity management system 130 using content delivery interface 116 or query interface 112 may correspond to one or more entities that are stored in entity data store 132 or otherwise may be authorized to access and use certain functionality of entity management system 130. A single user may create multiple different entities within entity management system 130, each with a same or similar name or title but targeted to a different purpose, interest, or audience. Alternatively or in addition, a representative of an organization may create an entity within entity management system 130 that represents the organization and has an associated profile so that other users can learn about the organization, follow the organization, and/or subscribe to messages and notifications issued by and/or about the organization.

Privacy Management System

In the embodiment of FIG. 1, privacy management system 150 includes an algorithm library 152, a allocation system 154, and a results data store 156. Although not specifically shown in FIG. 1, it will be understood that algorithm library 152, a allocation system 154, and a results data store 156 are bidirectionally communicatively coupled as needed to perform the functionality of privacy management system 150.

Algorithm library 152 contains computer-executable versions of one or more privacy algorithms that may be used by privacy management system 150 to determine privacy allocations and/or privacy scores. In an embodiment, algorithm library 152 includes a set of differential privacy algorithms implemented using computer programming code. Examples of differential privacy algorithms include known domain algorithms such as Laplace Mechanism and Exponential Mechanism, unknown domain algorithms with A-restricted sensitivity, and unknown domain algorithms with unrestricted sensitivity. Illustrative, non-limiting examples of privacy algorithms that may be included in algorithm library 152 are disclosed in U.S. patent application Ser. No. 16/527, 987, filed Jul. 31, 2019, incorporated herein by this reference. Privacy algorithms of algorithm library 152 are implemented as stateless methods, in an embodiment.

Allocation system 154 manages and maintains privacy allocations and privacy balances for requester accounts associated with requesters who issue queries to analytics component 138. Operations that may be performed by allocation system 154 are described in more detail below, with reference to FIG. 2 and FIG. 3.

Results data store 156 stores result sets that include aggregate data, such as aggregate entity and/or event information produced by analytics component 138 in response to queries received through query interface 112. Result sets stored in results data store 156 may be privatized. For example, results data store 156 may contain search results that have been modified by execution of one or more privacy algorithms of algorithm library 152, prior to delivery to the requester account. Alternatively or in addition, result sets stored in results data store 156 may be modified based on privacy allocation and/or privacy balance determinations made by allocation system 154, prior to delivery to the requester account.

Overview of Privacy Management Process

Figure 2:
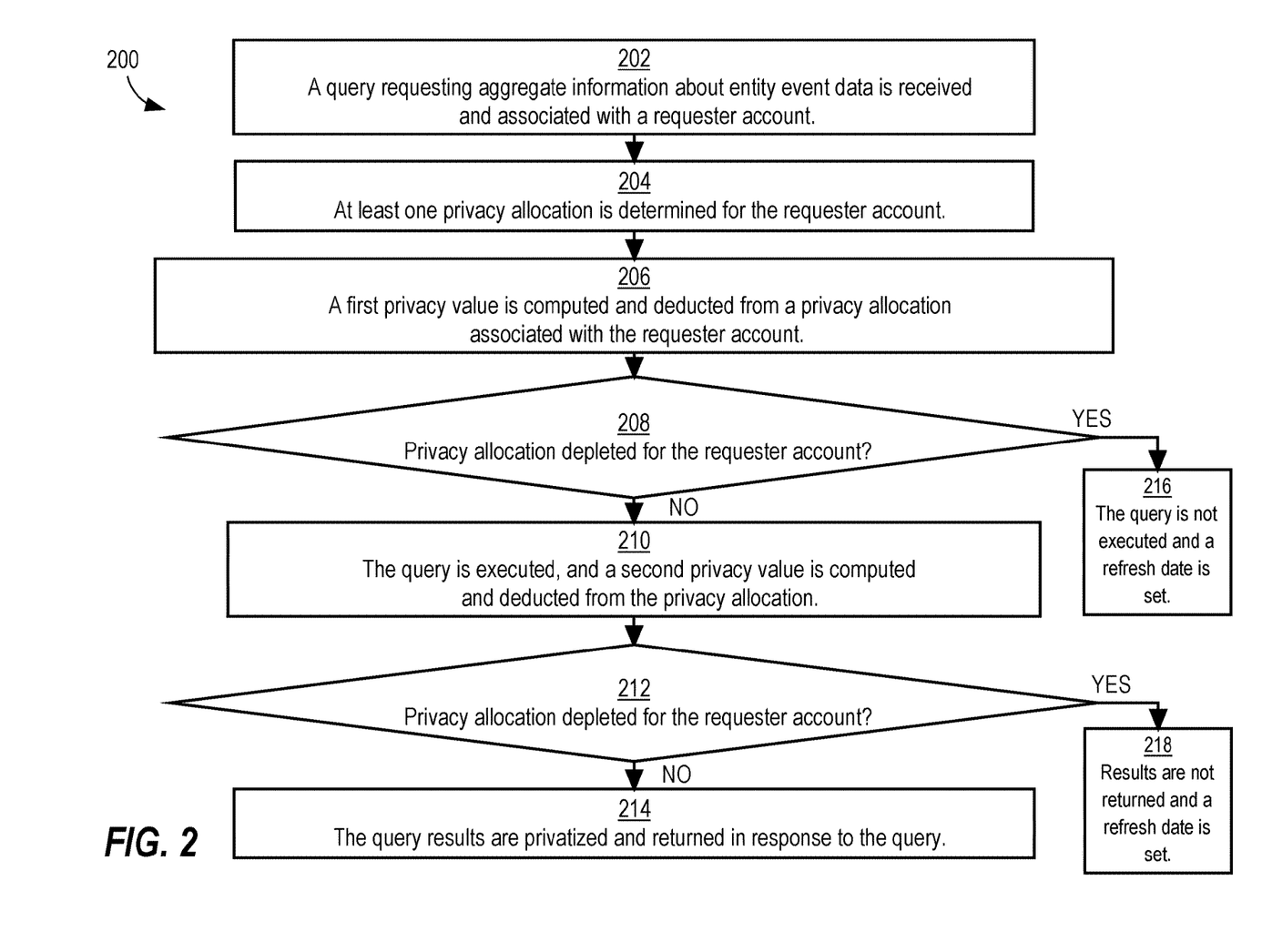
FIG. 2 is a flow diagram that depicts an example process, which may be performed by at least one component of the system of FIG. 1, in an embodiment.

FIG. 2 is a flow diagram that depicts an example process 200 for using a privacy allocation to manage the production of query results, in an embodiment. Process 200 may be implemented by at least one computing device; for example, one or more different components of system 100, such as one or more components of privacy management system 150 alone or in combination with one or more components of entity management system 130 and/or requester system 110.

For ease of discussion, process 200 is illustrated and described using a number of functional blocks and operations. It will be understood, however, that this disclosure is not limited to the particular arrangement and description of the functional blocks and operations of process 200. In addition, it will be understood that the functional blocks and operations of process 200 can include functionality that is described elsewhere in this disclosure; for example, functionality described as being performed by system 100 or one or more of the systems or components of system 100.

In operation 202, a query requesting aggregate information about entity event data is received and associated with a requester account. An example of a query requesting aggregate information is a top-k query that seeks information about, for instance, the top 10 most viewed articles (i.e., the articles with the highest number of unique viewers, i.e., article 1 has 10 viewers, article 2 has 25 viewers) during a specific time frame on a particular web site or web page. Other examples of queries requesting aggregated information include queries that seek statistics, such as the top 10 most frequently viewed articles (i.e., the articles viewed the most times, independently of the number of viewers; i.e., article 1 was viewed 10 times, but all by the same user, article 2 was viewed 25 times, but by 25 different viewers) during a time period, distributions, and histograms. An example of a query seeking a distribution is a request for the top 10 articles most likely to be of interest to a particular segment of a user population. An example of a query seeking a histogram is a request for counts of all engagements across a set of digital content items during a time period (i.e., for each digital content item, an identifier and a count of engagements). Queries requesting aggregate information may be received, for example, by analytics component 138 of entity management system 130, via query interface 112 of a requester system 110. In an embodiment, operation 202 records the query and an identifier for the requester account from which the query was received.

In operation 204, at least one privacy allocation is determined for the requester account. To do this, in an embodiment, operation 204 queries allocation system 154 of privacy management system 150 for a privacy allocation associated with the requester account identifier obtained by operation 202. An example of a privacy allocation that may be assigned to and stored for a requester account is a maximum number of queries that can be executed by the requester account during a time period. Another example of a privacy allocation that may be assigned to and stored for a requester account is a maximum amount of information that may be returned to the requester account, independently of the number of queries, during a time period. For instance, a requester's information allocation could be exceeded by a single query or by many queries over a time interval. In another example, the privacy allocation has multiple different components. For instance, the privacy allocation may have a query component that specifies a maximum number of queries and an information component that indicates a maximum amount of information that can be returned to a requester.

In operation 206, a first privacy value is computed and deducted from a privacy allocation associated with the requester account. An example of computing a privacy value is counting the number of queries executed by a requester within a time interval; for instance, incrementing a query count each time a query is executed for a requester account. Another example of computing an estimated privacy value is computing a privacy loss associated with a request, where the estimated privacy value is computed using a differential privacy algorithm. Privacy loss computations may be dependent upon query type. Illustrative, non-limiting examples of privacy loss computations are described in U.S. patent application Ser. No. 16/527,987, referenced above. Other examples of privacy loss computations are described below with reference to FIG. 3.

In operation 208, process 200 evaluates whether the privacy allocation determined in operation 204 has been depleted for the requester account. To do this, in an embodiment, operation 208 determines whether the deduction from the privacy allocation (obtained in operation 204) of the first privacy value (obtained in operation 206) results in a privacy balance value greater than zero (not depleted), or less than or equal to zero (depleted). If the privacy balance value indicates that the privacy allocation for the requester account (obtained in operation 202) is depleted, process 200 advances to operation 216. If the privacy balance value indicates that the privacy allocation for the requester account is not depleted, process 200 advances to operation 210.

In operation 210, the query received in operation 202 is executed, and a second privacy value is computed and deducted from the privacy allocation balance remaining after operation 206. In an embodiment, the second privacy value is computed as a privacy loss resulting from the return of privatized query results to the requesting account, where the privatized query results are produced by applying a privacy algorithm to a set of raw (non-privatized) query results. Privacy loss computations may be dependent upon query type. Illustrative, non-limiting examples of privacy loss computations are described in U.S. patent application Ser. No. 16/527,987, referenced above. Other examples of privacy loss computations are described below with reference to FIG. 3.

In operation 212, process 200 evaluates whether the privacy allocation balance remaining after deduction of the second privacy value (obtained in operation 210) indicates that the privacy allocation depleted for the requester account of operation 202 has been depleted. To do this, in an embodiment, operation 212 determines whether the deduction of the second privacy value from the privacy allocation balance after operation 206 results in a privacy balance value greater than zero (not depleted), or less than or equal to zero (depleted). If the privacy balance value indicates that the privacy allocation for the requester account is depleted, process 200 advances to operation 218. If the privacy balance value indicates that the privacy allocation for the requester account is not depleted, process 200 advances to operation 214.

In operation 214, the query results produced by operation 210 are privatized and returned to the requester account of operation 202, in response to the query received in operation 202. To privatize the query results, a privacy algorithm, for example a differential privacy algorithm, is applied to the query results. Application of the privacy algorithm to the query results may cause some data elements to be removed from the query results such that the privatized query results produced by operation 214 is a subset of the query results produced by operation 210. Additionally or alternatively, application of the privacy algorithm to the query results may cause some data elements to be added to the query results (noise, for example), such that the privatized query results produced by operation 214 is a superset of the query results produced by operation 210.

In operation 216, the query is not executed and a refresh date for replenishing the privacy allocation to its initial value is set. Thus, operations 208 and 218 can result in process 200 preemptively stopping execution of a query if the privacy allocation for the requester account already is exceeded.

In operation 218, query results are not returned to the requesting account, and a refresh date for replenishing the privacy allocation to its initial value is set. Thus, operations 212 and 218 can result in process 200 determining that the privacy allocation has been depleted after a query is executed but before query results are returned to the requesting account. In this way, operations 212 and 218 can preemptively prevent too much information from being provided to a requester account in response to a query.

In operations 216 and 218, a refresh date for replenishing the requester account's privacy allocation is determined and set. In an embodiment, the refresh date coincides with a refresh date of the database being queried. For example, if event datastore 134 is the database being queried, and the event data store 134 is completely refreshed every 30 days, than the refresh date for the privacy allocations for all requesters querying event data store 134 for aggregate information may be set to 30 days from the date of allocation depletion (i.e., a refresh rate of every 30 days).

Example of Privacy Management Process

Figure 3:
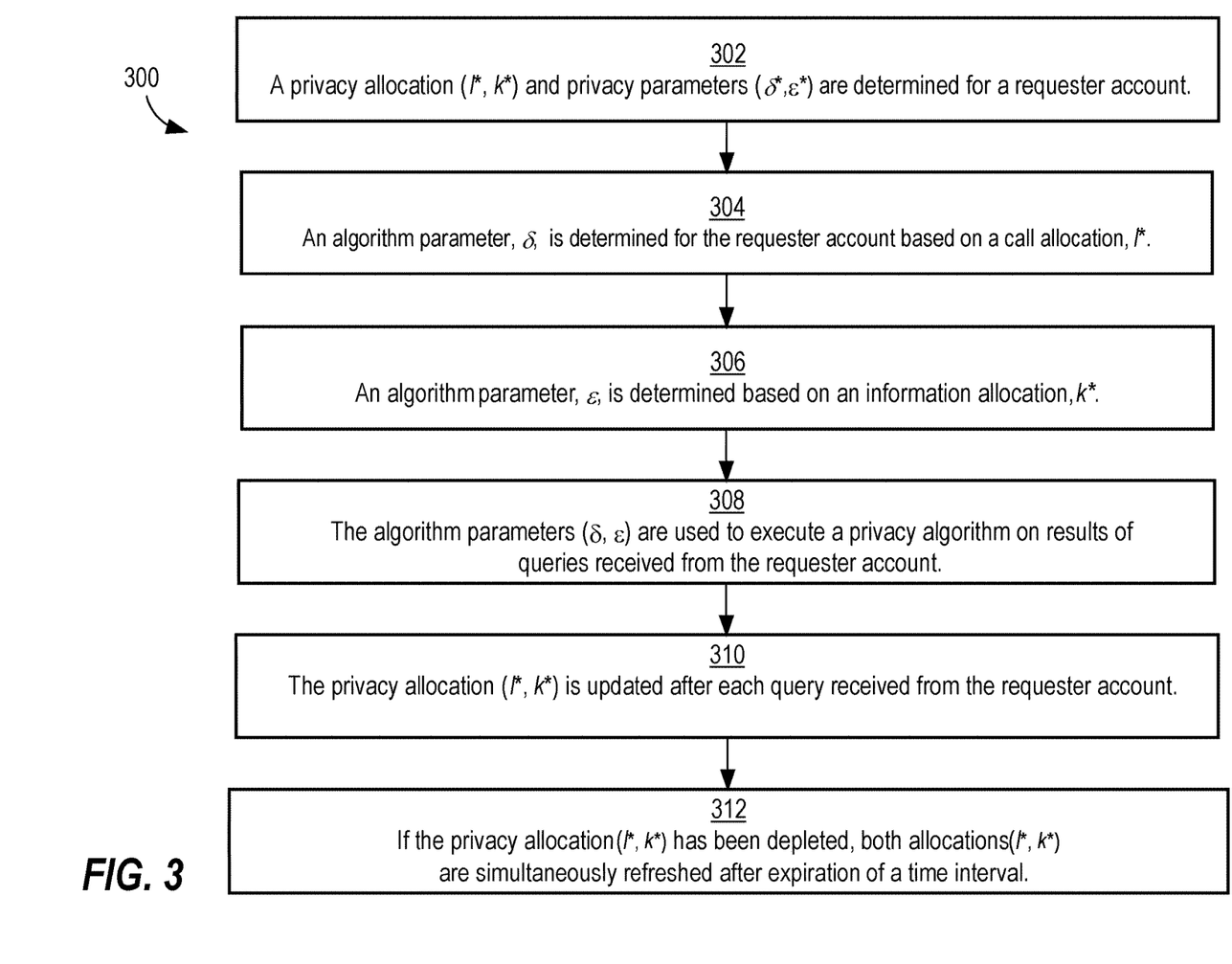
FIG. 3 is a flow diagram that depicts an example process, which may be performed by at least one component of the system of FIG. 1, in an embodiment.

FIG. 3 is a flow diagram that depicts an example process for managing a privacy allocation, which may be performed by at least one component of the system of FIG. 1, in an embodiment. Process 300 may be implemented by at least one computing device; for example, one or more different components of system 100, such as one or more components of privacy management system 150 alone or in combination with one or more components of entity management system 130 and/or requester system 110.

For ease of discussion, process 300 is illustrated and described using a number of functional blocks and operations. It will be understood, however, that this disclosure is not limited to the particular arrangement and description of the functional blocks and operations of process 300. In addition, it will be understood that the functional blocks and operations of process 300 can include functionality that is described elsewhere in this disclosure; for example, functionality described as being performed by system 100 or one or more of the systems or components of system 100.

In the embodiment of process 300, high confidence that no requester can identify any particular individual's data from any returned sets of query results is a design consideration. Thus, a strict overall ($\epsilon^*$, $\delta^*$)-DP guarantee is imposed as a design constraint, where $\epsilon^*$ and $\delta^*$ are privacy algorithm parameters to achieve the strict overall privacy guarantee, $\epsilon$ and $\delta$ are per-iteration privacy algorithm parameters determined at each iteration so as to achieve the overall privacy guarantee, $k^*$ is the allocation for the number of outcomes (e.g., information/results returned to a requester account in a given time interval) and $l^*$ is the allocation for the number of queries that can be executed for the requester account. In general, $\epsilon$ represents a privacy loss and $\delta$ represents a measure of the probability that the selected privacy algorithm can return a result with potentially larger privacy loss than $\epsilon$.

In operation 302, a total call allocation, $l^*$, is determined for a requester account. In an embodiment, the call allocation is the maximum number of queries that may be executed by the requester account on a database or dataset during a time interval. Factors that may be used to determine and set the call allocation for a particular requester account include but are not limited to: the types of information in the database, the number of different types of information (i.e., fields or attributes) in the database, a type, category, or function associated with the requester account, and the types of queries typically executed by the requester account against the database.

Also in operation 302, a total information allocation, $k^*$, is determined for the requester account. In an embodiment, the total information allocation $k^*$ represents the maximum amount of information that can be returned to the requester account over a given time interval. The time interval used to determine both $l^*$ and $k^*$ may be the same, and may correspond to a database refresh rate.

Also in operation 302, overall privacy parameters ($\epsilon^*$, $\delta^*$) are determined. In an embodiment, the overall privacy parameters ($\epsilon^*$, $\delta^*$) are the same for all requester accounts so that the same privacy guarantee applies to all requesters issuing queries for aggregate information against the database.

In operation 304, a per-iteration algorithm parameter, $\delta$ is determined based on the total call allocation determined in operation 302. That is, the number of queries that will be allowed to a particular requester can impact the $\delta$ value for that requester account. In an embodiment, the algorithm parameter $\delta$ is determined based on the privacy algorithm that is selected, which in turn may depend on the type of query that has been requested. For example, in one embodiment, $\delta=\delta^*/Al^*$, where $A$ is a positive integer.

In operation 306, an algorithm parameter, $\epsilon$, is determined using the information allocation, $k^*$ that was determined in operation 302. For example, in one embodiment, given the allocation for the number of queries and outcomes of queries ($l^*$, $k^*$), and the overall privacy parameters ($\epsilon^*$, $\delta^*$), the privacy parameters used in each algorithm ($\epsilon$, $\delta$) can be calculated based on the particular DP algorithm that is used. In an embodiment, the algorithm parameter $\epsilon$ is determined based on the privacy algorithm that is selected for the query and represents a measure of privacy loss, where a unit of $\epsilon$ corresponds to a unit of privacy loss. Thus, typically, smaller values for $\delta$ and $\epsilon$ imply that the privacy algorithm produces less privacy loss, or is more private.

In operation 308, the per-iteration algorithm parameters ($\delta$, $\epsilon$) determined in operations 304 and 306 are used to execute a privacy algorithm on results of one or more queries received from the requester account. The privacy algorithm used by operation 308 is selected based on the type of query that has been requested by the requester account, in some embodiments. For example, different types of privacy algorithms and/or algorithm parameters may be used depending on the type of counts the query is to return or the amount by which inclusion or removal of a single user's data can impact the result set.

For instance, a query asking for the number of members of an online system who have clicked on an article grouped by country might return some countries that have zero counts, in which case the privacy algorithm might return all results and apply noise to all of the results, including the zero counts, and then return the top few or the entire histogram of counts as requested. In another example, a query might request counts of all articles that members liked, and the privacy algorithm might return only articles that have positive counts. In yet another example, a query might request the number of people with a certain skill set across all countries. In this case, the privacy algorithm might determine how many results to return (i.e., how much of the histogram to return) based on whether a user can be in more than one country or is limited to being in only one country.

In operation 310, the privacy allocations ($l^*$, $k^*$) are updated after each query received from the requester account, such that $l^*$ represents the remaining call allocation (or call allocation balance) after the query has been executed, and $k^*$ represents the remaining information allocation (or information allocation balance) after a query result is returned to the requester account. The amount by which each privacy allocation (l*, k*) is reduced at a particular iteration may be determined based on the query type. For example, if a query result includes a histogram that has Δ-restricted sensitivity as described in U.S. patent application Ser. No. 16/527,987 then k* may be reduced by Δ; i.e., k*←k*−Δ. However, if a query result has unrestricted sensitivity then k*←k*−|o_i| where o_i is the outcome of the iteration (i.e., the quantity of data returned to the requester account by the query). In an embodiment, the call allocation is simply decremented at each iteration, i.e., l*←l*−1.

In an embodiment, where the set of query results contains per-member count information, a unique-count per-member cap may be imposed on the result set so that any individual member's impact on the reduction of k* is capped. For instance, suppose a query asks for the top 5 doctors who viewed an article, and doctor D viewed the article 1000 times but the other doctors all viewed the article 100 times or less. In this case, D's impact might be capped at 25 so that 25 instead of 1000 is used to compute the privacy loss.

In another approach, D's count might be split across multiple identifiers. For example, instead of associating 1000 with D's member identifier, 4 "DP identifiers" might be created and assigned 250 each. In an embodiment, both the call allocation and the information allocation are represented as positive integers, such that the privacy loss used to determine the amount by which each of the call allocation and the information allocation, respectively, is to be reduced, is quantified as a positive integer. For example, each time a query is executed for a requester account, the call allocation is reduced by one.

For the information allocation, in an embodiment, both results and order are considered in determining the information allocation privacy loss, in an embodiment. For example, a query that requests the top 10 most engaged-with articles plus like, comment, and share counts would result in a privacy loss to the information of [3 counts (like, comment, and share)+1 order (top 10)]×10 (number of items retrieved)=40 total counts, such that k* is updated to k*=k* minus 40 for the requester account at that iteration.

In operation 312, if either of the allocation balances (l*, k*) has been depleted, both allocation balances (l*, k*) are simultaneously refreshed after expiration of a time interval. That is, in an embodiment, if either the call allocation or the information allocation is depleted, both allocations are considered depleted and a timer is set, such that after the timer expires, both allocations may be replenished. During the time period in which one or both of the privacy allocations are depleted, the requesting account can neither execute any more queries nor obtain any more information from the database. The time interval used for refreshing privacy allocations is configurable according to the requirements of a particular application; for example, daily, weekly, monthly, etc.

Example of API With Privacy Management

Figure 4:
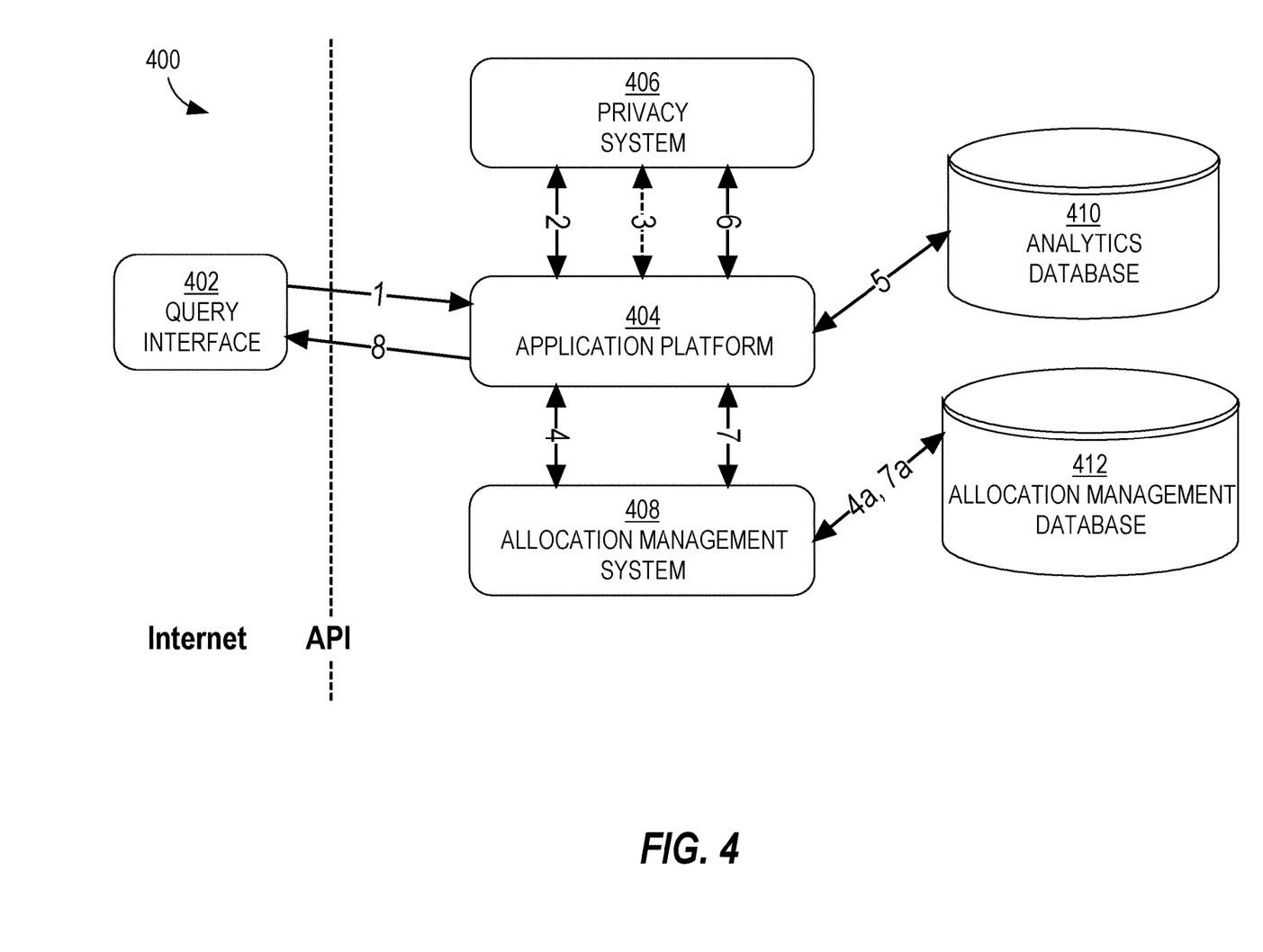
FIG. 4 is a block diagram that depicts a computing system, in an embodiment.

FIG. 4 is a block diagram of a system 400, which includes an API and privacy management for an application platform, where the application platform may comprise a single application, such as an online application, or multiple different applications may be supported by the platform. Portions of system 400 may be a component of, or included in, the system of FIG. 1, in an embodiment. Thus, all processes and functionality referred to herein as being performed by, or capable of being performed by, system 100 are also capable of being performed by system 400. Likewise, all processes and functionality referred to herein as being performed by, or capable of being performed by, system 400 are also capable of being performed by system 100. System 400 includes a query interface 402, an application platform 404, a privacy system 406, a allocation management system 408, an analytics database 410, and a allocation management database 412. The numbered bi-directional arrows shown connecting the various components 402, 404, 406, 408, 410, 412 represent bi-directional digital communications of data and/or instructions between the respective components 402, 404, 406, 408, 410, 412. In an embodiment, one or more of components 402, 404, 406, 408, 410, 412 may be implemented using library calls or as REST (representational state transfer)-type service.

At 1, application platform 404 receives a query from a requesting user using query interface 402, such as a data analyst, via an exposed API. Query interface 402 may be, for example, a client device located anywhere on the Internet. Application platform 404 may be, for example, entity management system 130 or analytics component 138 of entity management system 130.

At 2, application platform 404 invokes privacy system 406 to obtain an estimated privacy value for the query received at 1. To do this, application platform 404 may invoke a library call or REST-type service.

At 3, application platform 404 optionally invokes privacy system 406 to modify the query received at 1 in accordance with a privacy algorithm. Privacy system 406 may be implemented using methods to interact with a privacy library, where the methods may apply a privacy algorithm to modify the query received at 1 prior to execution or to change the raw query results into privatized query results after execution of the query.

At 4, application platform 404 invokes allocation management system 408 to check if the requesting user from which the query was received at 1 has enough privacy allocation to fulfill the query received at 1 as optionally modified at 3. In one implementation, a allocation management database 412 is used to store privacy allocation data for requesting users and at 4a, allocation management system 408 queries allocation management database 412 to check the privacy allocation. If allocation management system 408 determines that the requesting user does not have enough privacy allocation to fulfill the query received at 1 as optionally modified at 3, application platform 404 returns an exception/error to query interface 402.

At 5, application platform 404 issues the query received at 1 as optionally modified at 3 to analytics database 410, and obtains the raw query results from analytics database 410. In an embodiment, analytics database 410 is implemented using a real-time distributed OLAP datastore. In an embodiment, analytics database 410 may correspond to a combination of entity data store 132, event datastore 134, and content data store 136.

At 6, application platform 404 invokes privacy system 406 to modify the raw query results obtained at 5 into results that can be returned to the requesting user via query interface 402. Privacy system 406 also returns the value of the query and/or query results to be depleted from the privacy allocation.

At 7, application platform 404 invokes allocation management system 408 to deplete the privacy allocation balance by the appropriate amount. In one implementation, allocation management database 412 is used to store privacy allocation balance data for requesting users and at 7a, allocation management system 408 interfaces with allocation management database 412 to update the privacy balance.

In an embodiment in which allocation management system 408 is a distributed system or at least allocation management database 412 is distributed, privacy allocation operations (i.e., get/deplete) for a single requester, for instance at 2 or 4, are routed to a single host if possible, so that privacy allocation transactions can be batched to the back-end portion of allocation management system 408 or allocation management database 412 to improve performance.

As shown in FIG. 4, allocation management system 408 has its own back-end database, allocation management database 412, in an embodiment. In this implementation, additional queries to allocation management database 412 may be used to check a user's current privacy balance to determine whether to execute a query at all, fetch the user's remaining privacy balance after a query is executed, subtract the privacy value incurred by executing the query and returning results to the user, and update the user's remaining privacy balance after results are returned to the user.

Thus, in one embodiment, a user's privacy allocation is determined before the user's query is executed on the database and the user's privacy allocation is depleted after the user's query is executed. As an alternative to using queries, an API may be used to obtain current privacy allocation information for a user.

In one embodiment, allocation management database 412 is implemented using a distributed document-oriented database management system. In this scenario, a key-value based allocation management approach is used to ensure that the user's privacy balance is up to date. In a key-value approach, one key is created for each requesting user that may query the database (or a table of the database), and the data against the key is atomically changed when the user's allocation needs to be updated. Latency may be reduced by caching the key values for a user. In an embodiment, the primary key is a concatenation of a user identifier and application name, and the value record stores at least the following items: maximum allocation allowed for the user, time period over which the allocation is allowed, total allocation used so far (privacy balance remaining), and timestamp when the used allocation was last reset.

In another embodiment, allocation management database 412 is implemented using a real-time distributed OLAP datastore (real-time table). In this embodiment, allocation management system 408 issues queries to the real-time table to compute the usage so far, at each query. Thus, instead of depleting a allocation, a count is incremented with each query execution or return of query results, and the current count represents the amount of the user's privacy allocation that has been used thus far. The result of the query to the real-time table can be compared with the user's permitted allocation to determine whether to allow execution of the next query. To deplete the allocation, an event streaming platform is used to send the allocation depletion event to the real-time table.

Embodiments of system 400 can support and maintain different allocation quotas for different users using, for example, a particular configuration of a key-value store. Alternatively or in addition, embodiments of system 400 can include both of the above-described options such that either approach can be employed as needs and circumstances require. For example, the key-value approach may be implemented in applications in which reliably ensuring that users' privacy allocations are not exceeded is an important priority. On the other hand, the real-time table approach may be implemented in applications in which low latency is a high priority and not exceeding privacy allocations is less critical.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
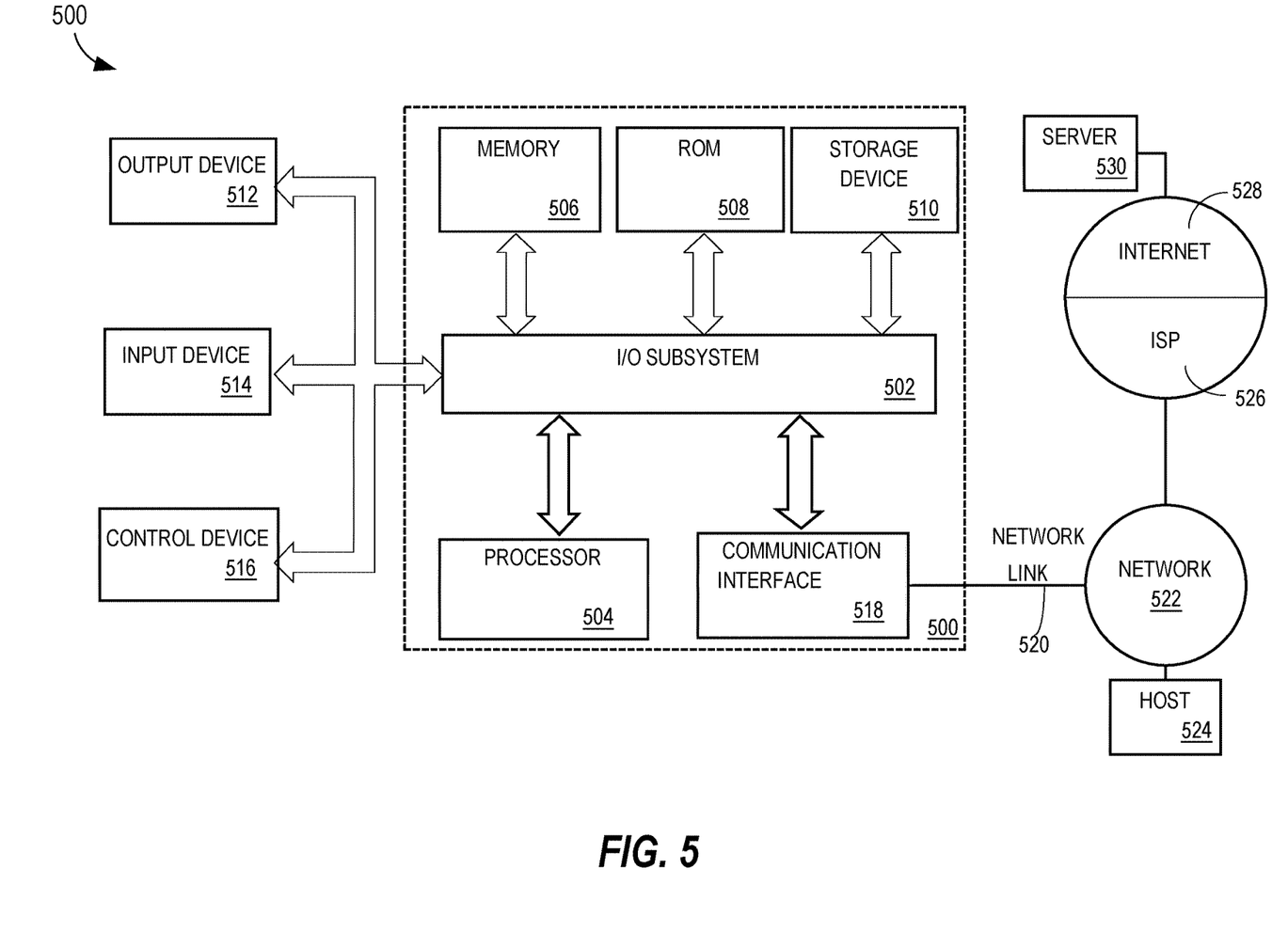
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes: receiving a query that requests aggregate information about entity event data relating to digital content delivered digitally by an entity management system to entities of the entity management system, the query associated with a requester account; determining a first privacy allocation for the requester account; determining a first privacy value, the first privacy value computed based on the query and a selected privacy algorithm; deducting the first privacy value from the first privacy allocation to produce a first privacy balance; causing executing of the query on the entity event data and providing a result set in response to the query only if the first privacy balance indicates that the first privacy allocation has not been depleted; where the method is performed by at least one computing device.

An example 2 includes the subject matter of example 1, further including: determining a second privacy allocation for the requester account; determining a privatized result set that contains aggregate information about the entity event data, the privatized result set produced by executing the selected privacy algorithm on a result set, the result set produced by executing the query on the entity event data; computing a second privacy value based on the privatized result set; deducting the second privacy value from the second privacy allocation to produce a second privacy balance; providing, in response to the query, the privatized result set only if the second privacy balance indicates that the second privacy allocation has not been depleted. An example 3 includes the subject matter of example 2, further including setting a query refresh date after which the query may be executed for the requester account if the first privacy allocation is depleted or the second privacy allocation is depleted. An example 4 includes the subject matter of example 3, further including setting the query refresh date to correspond to a data refresh rate used by the entity management system to automatically periodically refresh the entity event data. An example 5 includes the subject matter of any of examples 1-4, further including computing, as the first privacy value, a count of queries initiated by the requester account since a last query refresh date. An example 6 includes the subject matter of any of examples 1-5, further including determining the first privacy allocation based on at least one of: a query type associated with the query, a requester type associated with the requester account, or a data type associated with the entity event data. An example 7 includes the subject matter of example 2, further including computing, as the second privacy value, a quantity of data in the privatized result set. An example 8 includes the subject matter of example 7, further including computing, as the quantity of data, a count of data elements in the privatized result set plus a count corresponding to an order specified by the query. An example 9 includes the subject matter of example 2, further including determining at least one of the first privacy value or the second privacy value by computing an expected privacy loss using the selected privacy algorithm and converting the expected privacy loss to an integer. An example 10 includes the subject matter of example 2, further including storing at least one of the first privacy allocation and the first privacy balance or the second privacy allocation and the second privacy balance in a database record, associating the requester account with a key, and using the key to retrieve and update the database record. An example 11 includes the subject matter of example 2, further including storing a count used to determine at least one of the first privacy balance and the second privacy balance in a real-time analytics system and determining the at least one of the first privacy balance or the second privacy balance by transmitting an event to the real-time analytics system.

In an example 12, at least one storage media storing instructions that, when executed by at least one processor, cause: receiving a query that requests aggregate information about entity event data relating to digital content delivered digitally by an entity management system to entities of the entity management system, the query associated with a requester account; determining a first privacy allocation for the requester account; determining a first privacy value, the first privacy value computed based on the query and a selected privacy algorithm; deducting the first privacy value from the first privacy allocation to produce a first privacy balance; causing executing of the query on the entity event data and providing a result set in response to the query only if the first privacy balance indicates that the first privacy allocation has not been depleted.

An example 13 includes the subject matter of example 12, where the instructions, when executed by the at least one processor, further cause: determining a second privacy allocation for the requester account; determining a privatized result set that contains aggregate information about the entity event data, the privatized result set produced by executing the selected privacy algorithm on a result set, the result set produced by executing the query on the entity event data; computing a second privacy value based on the privatized result set; deducting the second privacy value from the second privacy allocation to produce a second privacy balance; providing, in response to the query, the privatized result set only if the second privacy balance indicates that the second privacy allocation has not been depleted. An example 14 includes the subject matter of example 13, where the instructions, when executed by the at least one processor, further cause setting a query refresh date after which the query may be executed for the requester account if the first privacy allocation is depleted or the second privacy allocation is depleted. An example 15 includes the subject matter of example 14, where the instructions, when executed by the at least one processor, further cause setting the query refresh date to correspond to a data refresh rate used by the entity management system to automatically periodically refresh the entity event data. An example 16 includes the subject matter of any of examples 12-15, where the instructions, when executed by the at least one processor, further cause computing, as the first privacy value, a count of queries initiated by the requester account since a last query refresh date. An example 17 includes the subject matter of any of examples 12-16, where the instructions, when executed by the at least one processor, further cause determining the first privacy allocation based on at least one of: a query type associated with the query, a requester type associated with the requester account, or a data type associated with the entity event data. An example 18 includes the subject matter of example 13, where the instructions, when executed by the at least one processor, further cause computing, as the second privacy value, a quantity of data in the privatized result set. An example 19 includes the subject matter of example 18, where the instructions, when executed by the at least one processor, further cause computing, as the quantity of data, a count of data elements in the privatized result set plus a count corresponding to an order specified by the query. An example 20 includes the subject matter of any of examples 12-18, where the instructions, when executed by the at least one processor, further cause determining at least one of the first privacy value or the second privacy value by computing an expected privacy loss using the selected privacy algorithm and converting the expected privacy loss to an integer.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    receiving a query that requests aggregate information about entity event data relating to digital content delivered digitally by an entity management system to entities of the entity management system, the query associated with a requester account;
    determining a first privacy allocation for the requester account;
    determining a first privacy value, the first privacy value computed based on the query and a selected privacy algorithm;
    deducting the first privacy value from the first privacy allocation to produce a first privacy balance;
    in response to the first privacy balance indicating that the first privacy allocation has not been depleted, causing executing of the query on the entity event data;
    determining a second privacy allocation for the requester account;
    determining a privatized result set that contains aggregate information about the entity event data, the privatized result set produced by executing the selected privacy algorithm on a result set, the result set produced by executing the query on the entity event data;
    computing a second privacy value based on the privatized result set;
    deducting the second privacy value from the second privacy allocation to produce a second privacy balance; and in response to the second privacy balance indicating that the second privacy allocation has not been depleted, providing the privatized result set in response to the query;

wherein the method is performed by at least one computing device.

2. The method of claim 1, further comprising setting a query refresh date after which the query may be executed for the requester account if the first privacy allocation is depleted or the second privacy allocation is depleted.

3. The method of claim 2, further comprising setting the query refresh date to correspond to a data refresh rate used by the entity management system to automatically periodically refresh the entity event data.

4. The method of claim 1, further comprising computing, as the first privacy value, a count of queries initiated by the requester account since a last query refresh date.

5. The method of claim 1, further comprising determining the first privacy allocation based on at least one of: a query type associated with the query, a requester type associated with the requester account, or a data type associated with the entity event data.

6. The method of claim 1, further comprising computing, as the second privacy value, a quantity of data in the privatized result set.

7. The method of claim 6, further comprising computing, as the quantity of data, a count of data elements in the privatized result set plus a count corresponding to an order specified by the query.

8. The method of claim 1, further comprising determining at least one of the first privacy value or the second privacy value by computing an expected privacy loss using the selected privacy algorithm and converting the expected privacy loss to an integer.

9. The method of claim 1, further comprising storing at least one of the first privacy allocation and the first privacy balance or the second privacy allocation and the second privacy balance in a database record, associating the requester account with a key, and using the key to retrieve and update the database record.

10. The method of claim 1, further comprising storing a count used to determine at least one of the first privacy balance and the second privacy balance in a real-time analytics system and determining the at least one of the first privacy balance or the second privacy balance by transmitting an event to the real-time analytics system.

11. At least one storage media storing instructions that, when executed by at least one processor, cause:

receiving a query that requests aggregate information about entity event data relating to digital content delivered digitally by an entity management system to entities of the entity management system, the query associated with a requester account;

determining a first privacy allocation for the requester account;

determining a first privacy value, the first privacy value computed based on the query and a selected privacy algorithm;

deducting the first privacy value from the first privacy allocation to produce a first privacy balance;

in response to the first privacy balance indicating that the first privacy allocation has not been depleted, causing executing of the query on the entity event data;

determining a second privacy allocation for the requester account;

determining a privatized result set that contains aggregate information about the entity event data, the privatized result set produced by executing the selected privacy algorithm on a result set, the result set produced by executing the query on the entity event data;

computing a second privacy value based on the privatized result set;

deducting the second privacy value from the second privacy allocation to produce a second privacy balance; and in response to the second privacy balance indicating that the second privacy allocation has not been depleted, providing the privatized result set in response to the query.

12. The at least one storage media of claim 11, wherein the instructions, when executed by the at least one processor, further cause setting a query refresh date after which the query may be executed for the requester account if the first privacy allocation is depleted or the second privacy allocation is depleted.

13. The at least one storage media of claim 12, wherein the instructions, when executed by the at least one processor, further cause setting the query refresh date to correspond to a data refresh rate used by the entity management system to automatically periodically refresh the entity event data.

14. The at least one storage media of claim 11, wherein the instructions, when executed by the at least one processor, further cause computing, as the first privacy value, a count of queries initiated by the requester account since a last query refresh date.

15. The at least one storage media of claim 11, wherein the instructions, when executed by the at least one processor, further cause determining the first privacy allocation based on at least one of: a query type associated with the query, a requester type associated with the requester account, or a data type associated with the entity event data.

16. The at least one storage media of claim 11, wherein the instructions, when executed by the at least one processor, further cause computing, as the second privacy value, a quantity of data in the privatized result set.

17. The at least one storage media of claim 16, wherein the instructions, when executed by the at least one processor, further cause computing, as the quantity of data, a count of data elements in the privatized result set plus a count corresponding to an order specified by the query.

18. The at least one storage media of claim 11, wherein the instructions, when executed by the at least one processor, further cause determining at least one of the first privacy value or the second privacy value by computing an expected privacy loss using the selected privacy algorithm and converting the expected privacy loss to an integer.

\* \* \* \* \*